INVENTORS
JESSE H. PLUMMER &
IRVING N. EINHORN
BY
ATTORNEYS

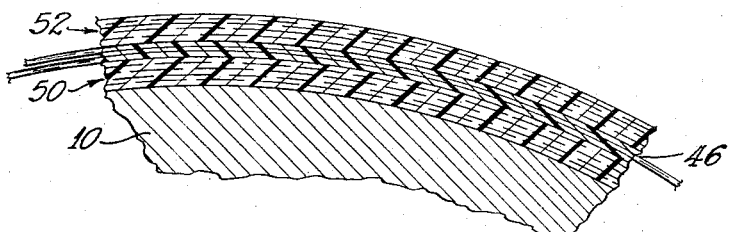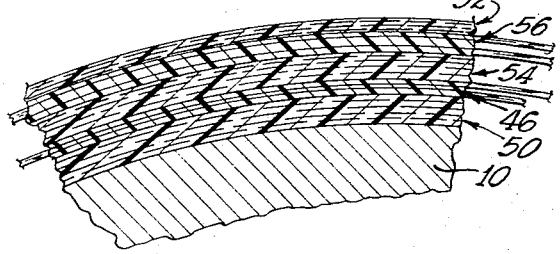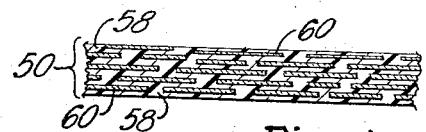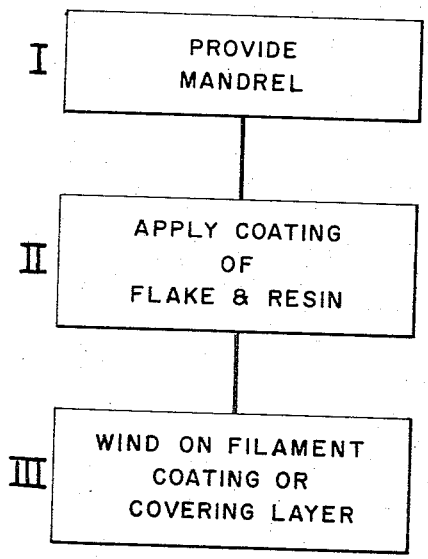

United States Patent Office

3,338,271
Patented Aug. 29, 1967

3,338,271
IMPERVIOUS TUBULAR WALL
Jesse H. Plummer, Toledo, and Irving N. Einhorn, Granville, Ohio, assignors to Owens-Corning Fiberglas Corporation, a corporation of Delaware
Filed Sept. 30, 1963, Ser. No. 312,485
7 Claims. (Cl. 138—174)

This invention relates to filament-wound vessels and, more particularly, to filament-wound vessels of improved imperviousness to fluids; and to a method for production.

BACKGROUND

The filament winding process is now broadly used for producing containers and the like of a substantial variety, and involves the following steps:

(1) Winding upon a core, such as water-soluble salt, a continuous strand saturated with a hardenable, liquid resin. This provides a wet shell overlay;

(2) Thereafter, the resin is polymerized or hardened or cured to fix the shape of the overlay; and (3) Then, the core is removed by suitable means.

In the event a tube-like structure is being produced, the core can be collapsed or by means of suitable release agents slidably removed coaxially from an end of the tubular overlay. In the event a completely enclosed shell has been made, a water-soluble core will have been used and this is removed as by dissolving.

Cores of other materials such as low melting resins and metals can also be used. These softenable materials can be removed by melting. Others can be removed by breakage; for example plaster.

From the foregoing, it will be evident that by attachment of suitable closures, pressure vessels can be favorably produced. These products are characterized by an extremely high strength-to-weight ratio.

Still further, such structures, including filament-wound drum, cylinder or sphere, provide an ideal environment for continuous glass fibers, because of the superior properties of such fibers in tension.

Further, in filament-wound structures, the resin holds the fibers in position to immediately assume load without elongation, and thus the matrix resin is subjected to little if any load before the glass fibers take the load or become effective.

THE PROBLEM

However, problems have been encountered in these prior art structures in that there is wall porosity, and thus the finished structures are not absolutely impervious to fluids, as is necessary in so many applications. Such fluids are liquid air, nitrogen, and the like of hard to retain character, particularly at cryogenic temperatures. Thus, the applicability of filament-wound structures could be substantially broadened if the walls thereof could be rendered absolutely impervious to fluids, including both gases and liquids.

Accordingly, a substantial step forward in the art would be provided by filament-wound structures having walls absolutely impervious to fluids; and by a process of producing such structures that is characterized by simplicity of performance, integration to the filament winding process, and additionally providing improved burst strength to the finished products.

Accordingly, it is an important object of the present invention to provide filament-wound structures of improved impermeability to fluids.

A further object is to provide a novel method of producing filament-wound structures having impervious walls.

A further object is to provide filament-wound structures characterized by internal, intermediate and external coatings rendering them not only impervious against the passage of fluids, but also rendering them of improved abrasion resistance on both exterior and interior surfaces.

A further object is to provide novel filament-wound structures incorporating fluid-impermeable membranes therein in the form of glass or other.

Other objects of this invention will appear in the following description and appended claims, reference being had to the accompanying drawings forming a part of this specification wherein like reference characters designate corresponding parts in the several views.

FIGURE 3 is an enlarged, cross sectional view of a product of invention positioned upon a forming mandrel, the product having only one resin-fiber layer, and inner and outer resin-flake layers;

FIGURE 4 is an enlarged, cross sectional view of a product of invention, similar to FIGURE 3, the product having a plurality of resin-fiber layers and with a resin-flake layer between each resin-fiber layer, and, additionally, coatings on the interior and external surfaces for very high pressure applications;

FIGURE 4a is an enlarged, fragmentary, sectional view of the resin-flake layer of invention; and FIGURE 5 is a schematic illustration of the process of invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

THE ENVIRONMENT

Figure 1:
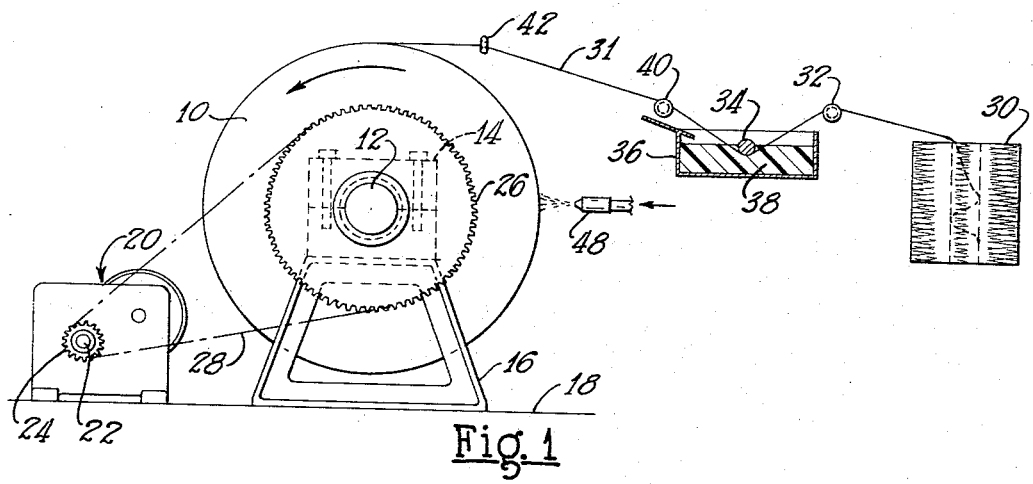
FIGURE 1 is a side elevational view of apparatus for producing filament-wound vessels.
Figure 2:
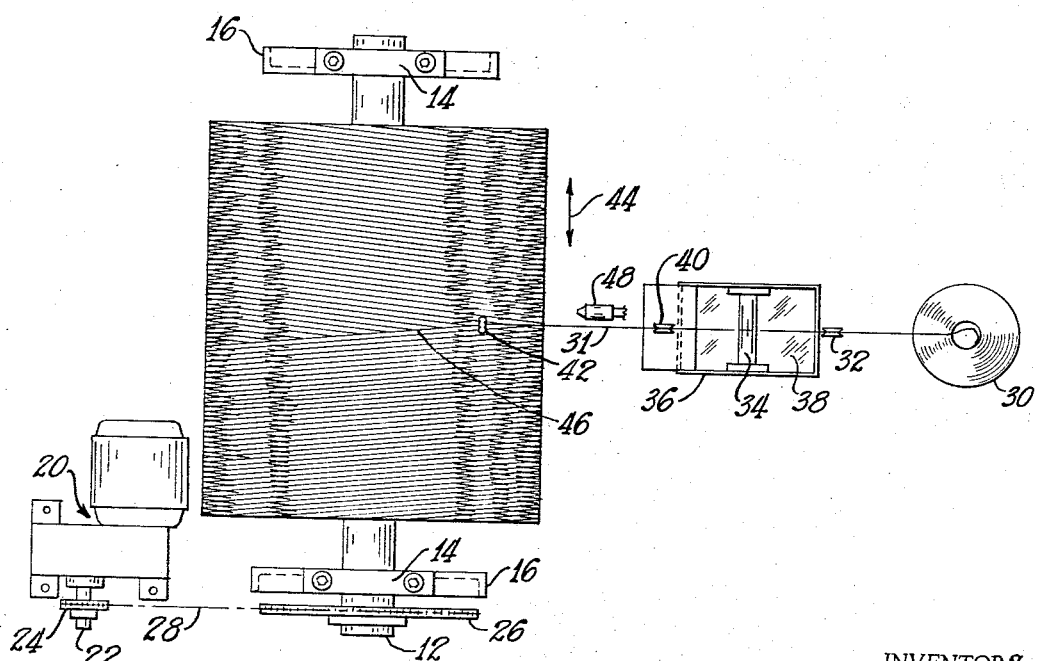
FIGURE 2 is a top plan view of FIGURE 1.

In FIGURES 1 and 2, there is illustrated filament winding apparatus for producing a part such as a cylindrical vessel. This apparatus includes a large rotatable mandrel 10, in this instance being shown as a solid cylindrical body mounted upon a shaft 12. The shaft 12 is carried in bearings 14 mounted at the top ends of supports 16. Ground level or floor level is indicated at 18.

Mounted adjacent to the mandrel 10 is a gear reduction drive motor 20 having a shaft 22 extending from the forward end thereof. To shaft 22 there is attached a drive sprocket 24. A larger driven sprocket 26 is mounted on shaft 12 supporting the mandrel 10, adjacent to bearing 14 and in alignment with the drive sprocket 24. Chain 28 laps sprockets 24 and 26 in driving relation.

According to the setting of the gear reduction motor unit 20, the speed of rotation of mandrel 10 is thereby established.

A continuous strand 31 is wound upon the mandrel 10 as it is rotated, being placed thereon in a criss-cross or other pattern as desired. As shown in FIGURES 1 and 2, the strand 31 is suitably fed from a package 30 over a first guide roll 32. A dip roll 34 is rotatably mounted within tank 36 that contains a body 38 of impregnating resin. It will be noted that strand 31 is fed beneath the guide roll 34 and thus immersed within the body 38 to become coated. From the dip roll 34, the strand 31 moves over a second guide roll 40 and thence proceeds to a traverser 42. This is shown schematically only, and as best shown in FIGURE 2, is adapted to be reciprocated in the arrow 44 direction to lay the strand 31 upon the rotating mandrel 10 according to the pattern 46, best shown in FIGURE 2. It should be noted at this point that impregnation of strand 31 as here described is exemplary and that other means can be employed.

THE INVENTION

As best shown in FIGURE 2, the process of invention is performed by first coating the mandrel 10 with a matrix of resin and glass flake or equivalent prior to laying on the continuously wound filament 31, impregnated in the manner shown. For this purpose, a gun 48 is used to apply the matrix to the mandrel as a uniform layer of resin and spaced flakes. This is shown as the layer 50 in FIGURE 3.

Thereafter, the winding on of the continuous filament 31 is done as shown in FIGURES 1 and 2. This is usually effected in a multiple strand thickness layer for adequate strength.

After the layer 46, FIGURE 3, of wound filament is completed, an overcoating 52 of either gel coat resin, or resin and flake similar to layer 50, FIGURE 3, can be applied for an abrasion-resistant outer coating.

It is to be understood, of course, that the inner coating will be sufficient to render the wall of the completed article impervious to the passage of fluids including either gases or liquids, due to the fact that it is positively pressed against the inside of the filament layer 46 by internal pressures exerted on the vessel wall; it is of course to be understood that suitable end caps are applied to the shape developed by FIGURES 1 and 2 of the drawings.

The outer coating is, of course, helpful but depends for its support upon adhesion between the outer matrix resin coat and the fiber layer 46. Thus, it is neither designed to, nor necessary to, resist internal pressure; but it would function to resist external pressures.

THE ARTICLE

In FIGURE 3, there is shown a section view through a product made in accordance with FIGURES 1 and 2. As there shown, the mandrel is designated 10, and the first resin-flake layer 50, as applied by the gun 48 of FIGURE 1. Upon the resin-flake layer 50, there next rests the pattern 46 of strands 31 with resin impregnant. Over the entire mass, there is applied either a straight gel coat or second resin-flake layer 52.

It will be evident from the foregoing described structure that the inner flake-filled coating 50 forms a fluid-impervious layer on the inner surface of the completed vessel, while the filament-wound layer 46 provides support and burst-resistant strength.

SECOND EMBODIMENT

As shown in FIGURE 4, the extended scope of invention includes a plurality of filament-wound layers with layers of resin-flake interspersed therebetween and with a flake-resin layer on the inner surface as well as some kind of protective coating over the outer surface.

In accordance with FIGURE 4, it will be observed that the mandrel 10 has a resin-flake layer No. 1, designated 50, lying directly thereon. Upon the top of this resin-flake layer 50, there is a pattern of filament bundles or strands of continuous fibers 46. At this point, in this embodiment, there now comes a second resin-flake layer designated 54; and upon that, the second layer of filament bundles or continuous strand in suitably wound-pattern form and designated 56.

Upon the top of the entire composite, there is then positioned the outer gel coat or resin-flake layer 52, as previously referred to in the discussion of the embodiment of FIGURE 3.

It will be evident from the foregoing that the concept of the invention comprises a layer of pressure-resistant lamina in which a plurality of continuous strands, such as glass strands, are wound into a suitable pattern and are embedded in a bonding matrix as of hardenable material. This lamina has a coating of hardenable matrix and impervious platelets or flakes lying against the underneath side thereof and bonded into a coherent mass.

This pattern may be repeated one or more times, depending upon the pressure conditions and usage to which the composite will be exposed.

The optional overcoating of resin or resin-flake will impart a scuff or abrasion-resistant surface to the outside of the finished vessel, providing a finish of truly professional and workmanlike nature.

RECAP OF THE PROCESS OF INVENTION

From the foregoing, it will be evident that the process of the present invention can be broken down into the following-enumerated steps as shown schematically in FIGURE 4 of the drawings:

*Step I.*—provide a suitable mandrel for the formation of a shape thereon;

*Step II.*—apply a coating of flake and resin to the naked mandrel, with a suitable parting agent applied between the mandrel and coating if desired or necessary; and

*Step III.*—wind on a filament layer to provide requisite strength to the structure, at the same time degassing the resin to remove porosity.

In view of the foregoing outline, a more elaborate discussion of the method steps now follows:

Step I.—Provide mandrel

The suitably can be a cylindrical body of metal, and inflatable rubber bag or a body of water-soluble salt or the like. In the case of metal, wood, or the like, it may be necessary or desirable to apply a mold-release agent to the outer surface before application of the flake-resin layer to permit release of the finished part therefrom after curing the resin. This may be particularly necessary with the epoxy resins as they are very tenacious materials when cured and have a tendency to stick to most any surface.

Step II.—Flake-resin coating

It is next in order to apply a layer of resin interspersed with flake or a resin-flake matrix to the surface of the mandrel. This is suitably done, as shown in FIGURE 1, by utilizing a gun capable of blowing both liquid resin and glass flake onto the mandrel. The flakes may be either milled or unmilled, and in the case of unmilled flake, will have a particle size of about ⅜ inch square. Milled flakes, of course, have smaller area, produced as by ball-milling of glass flakes, and their particle size is usually reduced to somewhat less than ¹⁄₁₆ inch square.

Additionally, the flake-resin layer can be built up by applying the resin at one point to the mandrel, followed by sprinkling the flakes by gravity onto the top surface of the mandrel to adhere to the wet resin previously applied. This can be continued until a desired flake-resin layer is built up, giving a very thoroughly wetted structure so that the bond between the resin and the flake will be essentially perfect, producing a truly fluid-proof barrier on the interior of the manufactured article.

Step III.—Filament layer

Now upon the flake-matrix covered mandrel, there is applied by filament winding technique a continuous strand impregnated with a resin that will be compatible with the resin of the flake-resin matrix first applied; the strand is placed upon the mandrel in covering relation to the resin-flake layer in a suitable pattern and closeness of lay to provide requisite tensile strength in the finished product.

A CLOSER LOOK AT THE RESIN-FLAKE MATRIX LAYER

Turn now to FIGURE 4a and note that the resin is designated 58 and the flake 60. Note the substantial area of the flakes 60 and the overlapping array thereof in the layer 50 to form in effect a continuous stratum or impermeable barrier against the passage of fluids.

It will be understood that as the continuous strands 31 are wound thereover, the flakes in layer 50 are methodically pressed together in essentially an intimate surface contacting relation, with a thin wetting film of liquid resin therebetween. This acts as a type of rolling or pressing operation, expelling most of the occluded air and gas from the resin and effectively and automatically degassing the same.

It will be understood that a highly effective fluid barrier is thereby produced in accordance with the present invention, the total structure being unique in that the layer itself need not have appreciable strength because it is backed up in the opposite direction from which pressure is exerted by the tremendously high strength continuous strands held by matrix resin in the layer 46, thus providing an extremely high pressure-resistant wall in tension, in combination with a fluid-proof barrier.

This is a unique combination and in the following claims, such broad concept is to be construed as being covered.

EXTENDED SCOPE OF INVENTION

The matrix materials for use in the invention broadly include hardenable resins such as thermosetting materials; these include epoxies, polyesters, modified acrylic systems, phenolics, polyurethanes, and the like. It is believed that these are sufficiently well-known materials that further elaboration on the chemical aspects thereof is not necessary. They are all listed in technical books and journals of the present art, and reference is made thereto for further and more specific identification. Also, "hardenable matrix" as used herein to be construed as such. Thus, a thermoplastic resin could be applied hot and allowed to cool for some applications. Still further, inorganic cements could be used. These would include the materials that hydrate to the solid state, such as Portland cement, plaster of Paris, etc.

Flake or impervious film layer: Broadly, the present invention comprises a fluid barrier within and supported or carried by a resin matrix or hardenable matrix material. It is therefore to be encompassed within the total scope of invention that glass flakes, either raw or milled, are included. This might also comprise heat-softenable resin flakes or fragments of films of either thermosetting or thermoplastic resins, or pliable resin films that have a known resistance to the passage of fluids or a known imperviousness. Glass flakes are particularly desirable because of their high resistance against fluid penetration as characterized by their substantial lack of porosity or voids. In some of the films made from synthetic resins, such as polyethylene and others, use is premised upon compatibility with the hardenable matrix material. The matrix resin should not attack or degrade such films as to render them porous. It is contemplated that reasonable equivalents of glass flakes such as graphite flakes, aluminum flakes, mica platelets, etc., are encompassed with the scope of invention.

Tensile members as used herein for the filament-wound layer are to be construed as substantially continuous elements, characterized by continuous glass strand. This is made up of a plurality, usually 200 or more in number, of continuous glass fibers gathered into strand form and held together by an abrasion-resistant coating or binder for integrity of the strand. While these are preferred for the invention because of their tremendously high tensile strength, analogous materials are encompassed within the scope of invention.

An advantage of the invention resides in the fact that the platelets in the resin matrix are effective to spread internal pressure more evenly to the flakes—or distribute the load. This in substance improves a filament-wound wall by rendering it capable of sustaining higher load without rupture.

"Filament winding" as used herein includes the use of tapes as well as strand as the winding medium. Further, rovings are to be included; a roving comprises a plurality of strands in parallel association as a loose cord or ropy structure.

It is to be noted that the bonding matrix materials, particularly the hardenable synthetic resins, used in this invention effectively cause the composite structure to become monolithic laminates.

We claim:
1. In a fluid-impervious wall of tubular structure having inner and outer surfaces,
    a layer of hardened thermosetting resin,
    a first portion of said layer having a layer of flakes of fluid-impervious material dispersed therethrough in an array extending in the plane of the layer of hardened resin, and in overlapping relation, and with the flakes separated from one another by matrix interposed therebetween,
    a second portion of said layer having a layer of cross-wound strands therein.
    and said cross-wound strands being located at a substantial distance from said inner and outer surfaces.
2. The invention of claim 1 wherein said flakes are parallel to one another.
3. The invention of claim 1 wherein said flakes are of siliceous material.
4. The invention of claim 3 wherein said flakes are glass.
5. The invention of claim 1 wherein said strands are glass.
6. The invention of claim 3 wherein said strands are glass.
7. The invention of claim 5 wherein said strands are made up of continuous glass filaments.

References Cited

UNITED STATES PATENTS

| | | | |
|---|---|---|---|
| 2,372,877 | 4/1945 | Binns et al. | 156—173 XR |
| 2,428,654 | 10/1947 | Collins | 161—141 |
| 2,614,058 | 10/1952 | Francis | 156—171 |
| 2,704,105 | 4/1955 | Robinson et al. | 161—163 |
| 2,977,264 | 3/1961 | Shapero et al. | 161—162 |
| 3,019,286 | 1/1962 | Anderson et al. | 161—163 |
| 3,084,088 | 4/1963 | Hunkeler | 117—126 |
| 3,110,299 | 11/1963 | Fox | 161—163 XR |
| 3,177,902 | 4/1965 | Rubenstein | 138—176 |

ALEXANDER WYMAN, *Primary Examiner.*
J. STEINBERG, *Examiner.*
W. POWELL, *Assistant Examiner.*